(12) United States Patent
Panikkar et al.

(10) Patent No.: US 11,657,112 B2
(45) Date of Patent: May 23, 2023

(54) ARTIFICIAL INTELLIGENCE-BASED CACHE DISTRIBUTION

(71) Applicant: Dell Products L.P., Round Rock, TX (US)

(72) Inventors: Shibi Panikkar, Bangalore (IN); Ravi Kumar, Taunton, MA (US); Thirumaleshwara Shama, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 17/236,287

(22) Filed: Apr. 21, 2021

(65) Prior Publication Data
US 2022/0342952 A1  Oct. 27, 2022

(51) Int. Cl.
  *G06F 16/00* (2019.01)
  *G06F 16/957* (2019.01)
  *G06N 5/04* (2023.01)
  *G06N 20/00* (2019.01)

(52) U.S. Cl.
  CPC .......... *G06F 16/9574* (2019.01); *G06N 5/04* (2013.01); *G06N 20/00* (2019.01)

(58) Field of Classification Search
  CPC ...... G06F 16/9574; G06N 5/04; G06N 20/00; G06N 7/01; G06N 20/10
  See application file for complete search history.

(56) References Cited

U.S. PATENT DOCUMENTS

| | | | | |
|---|---|---|---|---|
| 10,705,973 B2* | 7/2020 | Gschwind | ........... | G06F 12/0875 |
| 10,966,122 B2* | 3/2021 | Fu | ........ | H04L 41/5009 |
| 11,188,857 B1* | 11/2021 | Hill | ........ | G06F 3/167 |
| 11,302,055 B2* | 4/2022 | Desai | ........ | H04L 67/59 |
| 11,461,351 B1* | 10/2022 | Field | ........ | G06F 16/2282 |
| 11,562,267 B2* | 1/2023 | Polleri | ........ | H04L 51/02 |
| 2006/0271641 A1* | 11/2006 | Stavrakos | ........ | G06F 16/9574 |
| | | | | 709/217 |
| 2014/0324747 A1* | 10/2014 | Crowder | ........ | G06N 3/086 |
| | | | | 706/18 |
| 2018/0005296 A1* | 1/2018 | Eades | ........ | G06Q 30/0631 |
| 2018/0307710 A1* | 10/2018 | Dai | ........ | G06N 20/00 |

(Continued)

OTHER PUBLICATIONS

B. Stecanella, "An Introduction to Support Vector Machines (SVM)" https://monkeylearn.com/blog/introduction-to-support-vector-machines-svm/#:~:text=A%20support%20vector%20machine%20(SVM,able%20to%20categorize%20new%20text, Jun. 22, 2017, 20 pages.

(Continued)

*Primary Examiner* — Noosha Arjomandi
(74) *Attorney, Agent, or Firm* — Ryan, Mason & Lewis, LLP (57) ABSTRACT

Techniques are disclosed for data management techniques using artificial intelligence-based cache distribution within a distributed information processing system. For example, a cohesive and distributed machine learning approach between the same or similar customer data centers and products predict optimal data needed at each customer data center, and intelligently synchronize or federate the data between customer data centers and a core data center using a combination of customized caching and push techniques according to one or more customer behavior patterns.

20 Claims, 7 Drawing Sheets

(56) References Cited

U.S. PATENT DOCUMENTS

| | | | |
|---|---|---|---|
| 2019/0243570 A1* | 8/2019 | Mittal | G06F 13/1694 |
| 2020/0067789 A1* | 2/2020 | Khuti | G06N 5/046 |
| 2020/0201690 A1* | 6/2020 | Sankaralingam | G06F 12/0833 |
| 2020/0201775 A1* | 6/2020 | Zhang | G06F 12/0822 |
| 2020/0204626 A1* | 6/2020 | Zhang | H04L 67/01 |
| 2020/0341899 A1* | 10/2020 | Dias | G06F 12/0862 |
| 2021/0019979 A1* | 1/2021 | Mackenzie | G07F 9/006 |
| 2021/0133670 A1* | 5/2021 | Cella | G06N 5/01 |
| 2021/0191957 A1* | 6/2021 | Swamy | G06F 16/254 |
| 2021/0319349 A1* | 10/2021 | Srivastava | G06N 20/00 |
| 2021/0409506 A1* | 12/2021 | Radi | H04L 43/16 |
| 2022/0019909 A1* | 1/2022 | Aggarwal | G06N 7/01 |
| 2022/0036302 A1* | 2/2022 | Cella | G06Q 10/0834 |
| 2022/0043752 A1* | 2/2022 | Hua | G06F 12/0862 |
| 2022/0108035 A1* | 4/2022 | Mehta | G06F 8/658 |
| 2022/0187847 A1* | 6/2022 | Celia | G05B 19/41885 |
| 2022/0197306 A1* | 6/2022 | Cella | B25J 9/163 |
| 2022/0269957 A1* | 8/2022 | Rangan | G06N 7/01 |
| 2022/0294689 A1* | 9/2022 | Brocato | H04L 41/0886 |
| 2022/0294866 A1* | 9/2022 | Brocato | G06F 16/955 |
| 2022/0295117 A1* | 9/2022 | Brocato | G06F 12/084 |
| 2022/0342952 A1* | 10/2022 | Panikkar | G06N 20/00 |
| 2022/0365882 A1* | 11/2022 | Edwards | G06F 12/0895 |

OTHER PUBLICATIONS

Wikipedia, "Support-vector Machine," https://en.wikipedia.org/wiki/Support-vector_machine, Apr. 18, 2021, 20 pages.

Wikipedia, "Linear Regression," https://en.wikipedia.org/wiki/Linear_regression, Apr. 15, 2021, 17 pages.

Bayes Server, "Prediction with Bayesian Networks," https://www.bayesserver.eom/docs/techniques/prediction#:~:text=Joint%20prediction,are%20in%20the%20same%20model, Accessed Apr. 19, 2021, 10 pages.

Wikipedia, "Edge Computing," https://en.wikipedia.org/wiki/Edge_computing, Apr. 2, 2021, 5 pages.

Wikipedia, "Fog Computing," https://en.wikipedia.org/wiki/Fog_computing, Feb. 1, 2021, 5 pages.

* cited by examiner

| LOCATION | WHAT IT DOES | ML TECHNIQUE | ML OBJECTIVE | DATA | IS SENSITIVE |
|---|---|---|---|---|---|
| EDGE | CONSUMPTION USAGE IN DIFFERENT PRODUCTS BY DEPARTMENT | LINEAR REGRESSION IF NOT MUCH OF SEASONAL CHANGES BAYESIAN MODEL, IF THERE ARE UPS AND DOWN IN THE CONSUMPTION RATE | PREDICT THE USAGE FOR NEXT 6 MONTHS OPTIMIZE THE USAGE BY DEPARTMENT | POWER SCALE: CONSUMPTION BY NODE VxRAIL: CONSUMPTION BY INSTANCE | PARTIALLY YES - EVEN THOUGH CUSTOMER DEPARTMENT INFORMATION IS NOT PII, DEPENDS ON CUSTOMERS IT WILL NOT SEND THE DATA TO CORE |
| REGION | CONSUMPTION USAGE IN DIFFERENT CUSTOMER'S USERS | CLUSTERING (KNN) BASED ON THE USER CATEGORIES AND LINEAR REGRESSION ON THE PREDICTION | PREDICT THE SPACE REQUIRED FOR CUSTOMER'S USERS OPTIMIZE THE CAPACITY | USER DATA AND CONSUMPTION DATA | YES USER INFORMATION IS PII FOR CUSTOMER. WILL NOT PASS TO CORE |
| CORE | CONSUMPTION USAGE GLOBALLY | CLUSTERING (KNN) BASED ON THE USER CATEGORIES, BAYESIAN MODEL WITH SEASONALITY AND LINEAR REGRESSION FOR SMOOTHENING | PREDICT THE USAGE FOR CUSTOMER SET COMPUTE THE CACHING REQUIREMENT AT EDGE, REGION | USER DATA AND CONSUMPTION REGIONAL ML RESULT | NO |

ARTIFICIAL INTELLIGENCE-BASED CACHE DISTRIBUTION

FIELD

The field relates generally to information processing systems, and more particularly to data management in such information processing systems.

BACKGROUND

Edge computing is a distributed computing paradigm that provides for computation and storage resources to be deployed closer to data sources in order to improve response performance and reduce network bandwidth. Thus, edge networks and edge devices (networks and devices that implement an edge computing paradigm) provide users access to their data with lower latencies, while reducing the load on the backhaul and the core network (e.g., cloud computing-based data center). With the emergence of 5G networks, the reality of effective implementations of the edge computing paradigm is rapidly evolving. User mobility, preferences, and content popularity are examples of dominant dynamic features of edge networks.

Assume a technology enterprise seeks to deliver its technology and corresponding services to customers in an architecture that brings together an Anything-as-a-Service (XaaS) paradigm and a cloud computing paradigm. XaaS is a category of services related to computing and remote access whereby a large number of different technologies (e.g., hardware and/or software products, tools, etc.) are deliverable to users or otherwise supportable as a service over the Internet or some other data network. This service delivery paradigm enables a customer to perform services (applications) such as, by way of example, commerce (buy/sell), provisioning (deploy different services from cloud platforms to the customer locations), and support (remote support for incidence, upgrades, patching, etc.), in accordance with an XaaS/cloud infrastructure. However, such applications need to connect to the customer site system architecture. For example, a customer data center or appliance needs to connect with the XaaS/cloud infrastructure to perform these commerce, provisioning and support applications. This presents data management challenges since each customer site is typically unique and has specific requirements as compared with other customer sites.

SUMMARY

Illustrative embodiments provide data management techniques using artificial intelligence-based cache distribution within a distributed information processing system.

For example, in an illustrative embodiment, executed in a system comprising first processing platforms located at one or more sites at which one or more products are used, at least a second processing platform operatively coupled to a group of the first processing platforms, and at least a third processing platform operatively coupled to the second processing platform, a method comprises the following steps. The method collects data at each of the first processing platforms related to usage of the one or more products, generates at each of the first processing platforms usage prediction data from the collected data using at least one machine learning algorithm, and sends from each of the first processing platforms the usage prediction data to the second processing platform.

Further, the method receives at the second processing platform the usage prediction data from each of the group of first processing platforms, generates at the second processing platform group usage prediction data from the usage prediction data from each of the group of first processing platforms using at least one machine learning algorithm, and sends from the second processing platform the group usage prediction data to the third processing platform.

Still further, the method receives at the third processing platform the group usage prediction data from the second processing platform, generates at the third processing platform product prediction data from the group usage prediction data using at least one machine learning algorithm, generates at the third processing platform a cache data set responsive to the product prediction data, and dispatches from the third processing platform the cache data set to one or more of the first and second processing platforms.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide a cohesive and distributed machine learning approach between the same or similar customer data centers and products to predict optimal data needed at each customer data center, and intelligently synchronize or federate the data between customer data centers and a core data center using a combination of customized caching and intelligent push techniques according to one or more customer behavior patterns.

These and other illustrative embodiments include, without limitation, apparatus, systems, methods and computer program products comprising processor-readable storage media.

DETAILED DESCRIPTION

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud and non-cloud computing and storage systems, as well as other types of processing systems comprising various combinations of physical and virtual processing resources. An information processing system as the term is used herein also encompasses one or more edge computing networks (e.g., customer data centers), and one or more fog computing networks which are typically regional networks (e.g., regional data centers) coupled between one or more edge computing networks and one or more cloud computing networks (e.g., core data center). It is to be understood that cloud, fog and edge computing networks can include private, public, and/or combinations of private/public (hybrid) computing architectures.

One approach to address data management challenges mentioned above in the background section is to use the customer data center equipment as part of an edge computing platform that connects with the XaaS/cloud infrastructure. This would require enabling the edge computing platform at the customer site to maintain customer specific data in order to perform one or more of the commerce, provisioning and support applications. However, as mentioned above, this is challenging since each customer site is different and thus requires decisions to be made at the edge computing platform of each customer as to what data to be cached, how long data should be cached, at what frequency should the data be cached, and what to communicate to the XaaS/cloud infrastructure.

Illustrative embodiments provide solutions for addressing the above and other challenges of providing XaaS applications and other functionalities at an edge computing platform of a customer as will be explained in detail in the context of the figures.

Assume that a technology enterprise (e.g., Dell Technologies Inc.) provides a hardware deployment model wherein computing, storage and/or network products are installed at a given customer site (i.e., customer data center) and the customer is charged based on their usage of the installed computing, storage and/or network products. Further assume that the technology enterprise maintains a cloud computing platform (i.e., core data center) through which customers can perform, by way of example only, functions such as commerce (e.g., buy/sell), provisioning (e.g., deploy different services to the customer locations), and support (e.g., remote support for incidence, upgrades, patching, etc.). In order to accomplish delivery of such services, the core data center needs to connect to the hardware at the customer site (i.e., customer data center) for usage collection and metering for billing. Such customer hardware would be considered as part of one or more edge computing networks. Further assume that the technology enterprise also realizes that in order to guarantee lower latency and data compliance, one or more regional data centers are maintained between the customer data centers and the core data center. Thus, in terms of overall information processing system architecture, a cloud computing network (i.e., a core data center) is coupled to one or more fog computing networks (i.e., regional data centers) which are each coupled to a set of edge computing networks (i.e., customer data centers).

However, it is realized herein that in order to eliminate costs associated with all of these data center deployments, it would be beneficial to enable the customer data centers with customer specific data to perform activities such as, but not limited to, buying and selling functions, provisioning of software, workload execution and support functions, so as to minimize interaction with the core data center. Trying to maintain such customer specific data at a plurality of edge computing networks is challenging since the products and needs of each customer is different. Also, in some scenarios, a given customer of the technology enterprise can have multiple data centers. As such, a main challenge focuses on, inter alia, deciding for each edge computing network what data to be cached, how long data should be cached, at what frequency should data be cached, and what to communicate to the core data center through a regional data center.

Illustrative embodiments provide artificial intelligence-based cache distribution functionalities to address these and other challenges. More particularly, illustrative embodiments employ machine learning computational algorithms (ML algorithms) throughout a distributed information processing system architecture with core, fog and customer data centers to provide secure and optimal data management. Using ML algorithms, as will be explained in detail below, illustrative embodiments address cache placement (e.g., what to cache, and where to cache for different customer locations); cache policies (e.g., proactive caching, reactive caching, or otherwise when to cache); cache replacement (e.g., at what frequency to replace data and what to replace); and an intelligent delivery strategy (e.g., how data is to be exchanged). Further, illustrative embodiments provide for different levels of caching such as, for example, generic cache at the core data center for all customers (e.g., cloud policy); regional cache at the regional data centers for customers who are in a specific region (e.g., regional compliance data) and to maintain a "customer set" for each group of customers who possess similar products and similar usage characteristics; and customer specific cache at the customer data centers for maintaining "customer specific" data. While example use cases described herein focus on data involving commerce (e.g., subscribe, unsubscribe, expand, renew, usage, billing), provisioning (e.g., software, workload), and support (e.g., incident, knowledge, upgrades), illustrative embodiments are not intended to be so limited.

It is to be understood that the terms "cache prediction," "cache optimization," "cache delivery," "cache synthesis," "cache dispatching," and the like, refer to prediction, optimization, delivery/dispatching, synthesis, etc. of/for content (data) that is cached (stored) or to be cached in one or more of customer data centers, regional data centers and a core data center.

As mentioned above, it is realized herein that each customer business is different, and the purchased devices from a given technology enterprise such as Dell Technologies Inc. (or other cloud providers), will be different. Similarly, operations that a customer performs in its customer data center will be different. If a complete copy of generic data is downloaded to all customers, such an approach can cause significant network congestion and disrupt the system for one or more customers.

Thus, in one or more illustrative embodiments, it is realized that data that needs to be returned to the core data center from a given customer data center is mainly for the previously-mentioned operations performed at the given customer data center of commerce, provisioning and support. As such, it is important to keep data that is meaningful to each customer data center. Existing systems do not account for these issues.

A traditional way of implementing machine learning (ML) computing is to send data from the customer data center to the core data center and to perform the ML computing for predictions, classifications, etc. at the core data center. However, depending on the geographic jurisdiction of the customer location, this may violate data compliance regulations especially if the transferred data includes private data. Also, to attempt to perform the ML computing solely at the customer data center is counter to the nature of an edge computing platform which utilizes limited capacity compute and storage resources. Federated learning is a consideration, however, in an algorithm such as the Federated Average Algorithm, stochastic gradient descent (SGD) does not account for the heterogeneous products and different types of usage in the customer data center.

As mentioned, a given customer can have multiple data centers across a geographic area. It is thus realized herein that there can be similarity, as well as uniqueness, in operations among the various data centers of the given customer. Thus, it is further realized that some of the data centers together can be served by a single edge cluster whereby the determination as to which data centers to include in the single edge cluster can be based on the similarity in operations, as well as regional data compliance and latency. Further, a determination can be based on one data center action and confirm the data availability in another data center through the LAN/WAN network of the customer. Still further, once the data to be stored is determined (e.g., cached at the customer data center), an intelligent data synchronization and federating process can be used at the core data center to control the data syncing and federating for potentially thousands of customer data centers.

Illustrative embodiments address these needs and challenges using a cohesive and distributed machine learning (CDML) data management approach. By way of example, CDML can be performed between the same or similar customer data centers and products to predict the optimal data required at each customer data center, and intelligently synchronize (sync) or federate the data between the customer data centers and the core data center using a combination of customized coded caching and intelligent push-to-edge techniques according to a customer behavior pattern.

As mentioned above, three types of data managed in an enterprise-customer data center environment include commerce-based data (e.g., data at edge computing network, offers for customers, products for expansion to current sales, customer specific pricing, customer specific deals, current installed sites, draft orders, and active subscription of customer), provisioning-based data (e.g., customer specific software bits, customer licenses, and customer specific provisioning scripts), and support-based data (e.g., customer incident data and upgrade schedules). In accordance with illustrative embodiments, caching of such data can be done in multiple ways: (i) proactive (prefetch) based on industry type and learning-based; and (ii) reactive such as traditional methods (first-in-first-out (FIFO), least recently used (LRU)) and learning-based.

The CDML approach can implement the above and other caching and may be considered in three functional parts:

(1) Caching strategies to define the location of the cache (e.g., edge, region or customer LAN/WAN) and mode of cache (e.g., proactive or reactive). For example, the approach can first start with a proactive cache load, until enough CDML results are available, then the CDML results are applied to optimize the cache.

(2) ML techniques and objectives (e.g., prediction of edge data for a specific customer, optimizing the cache at the customer location and clustering customers, products at region and core, based on the similarities in industry, products and usage for optimal caching delivery).

(3) Delivery strategies to reduce the load on both backhaul and fronthaul and optimize the cache object at the caching location (edge/region). In accordance with one or more illustrative embodiments, three types of delivery are provided: (i) Point-to-Point (e.g., directly to a specific edge computing network, e.g., customer specific discounts); (ii) Multicast (e.g., applicable to all customers, e.g., change in third party licensed products); and (iii) Coordinated Multi-Point or CoMP (e.g., changes for a specific customer set).

Figure 1:
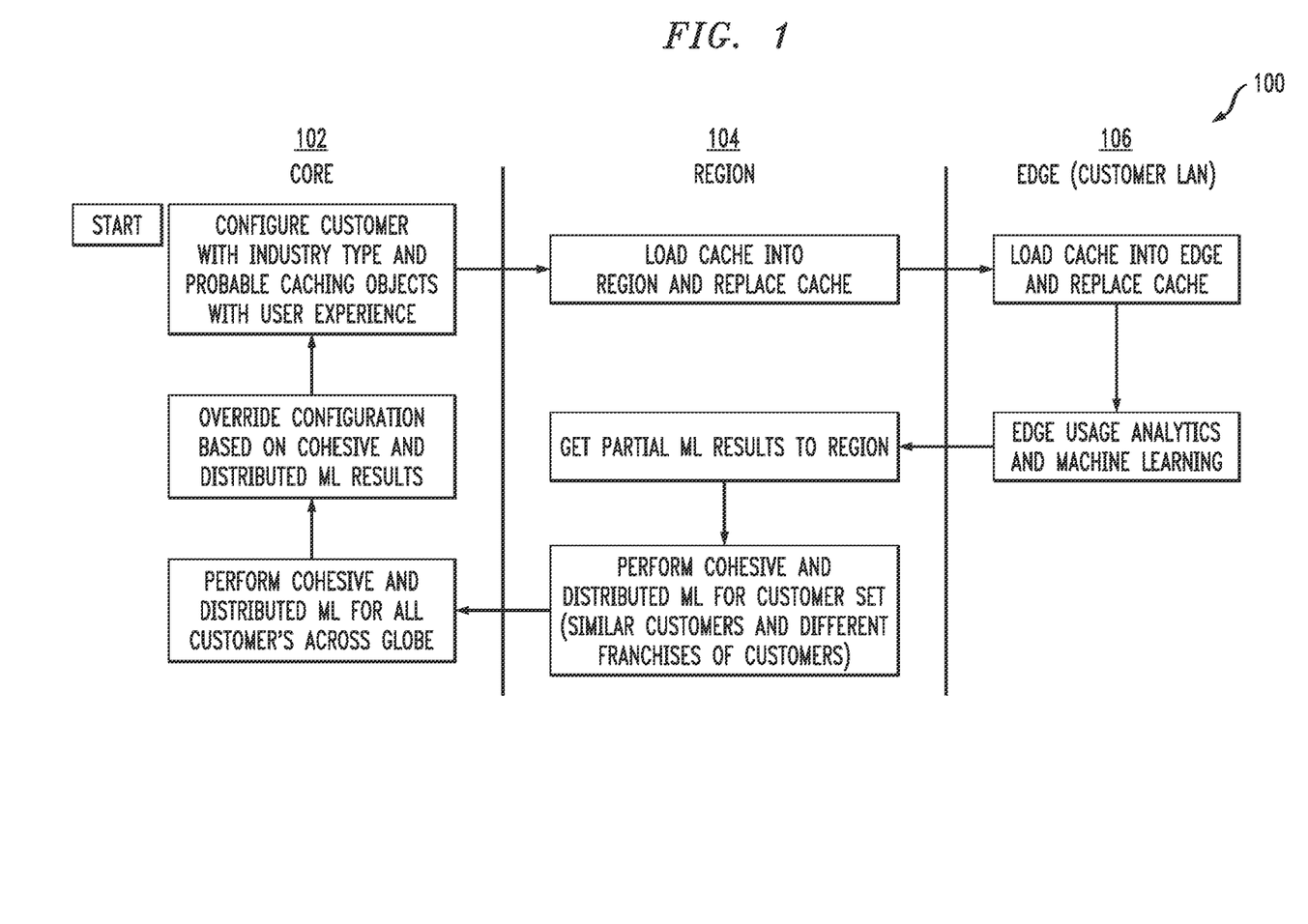
FIG. 1 illustrates caching strategies for artificial intelligence-based cache distribution according to an illustrative embodiment.

FIG. 1 illustrates caching strategies 100 across a core data center 102, a region(a1) data center 104 and a customer data center (also referred to herein as customer location/edge or local area network or LAN) 106 according to an illustrative embodiment.

Initial cache loading is an issue in traditional FIFO or LRU cache strategies. Initially, there is no cache loaded and frequently used data is cached at the edge (customer LAN). However, in accordance with CDML, the cache can be initially loaded (if no ML results are available at that point) optimistically according to, for example, administrator experience. After some operational time, CDML replaces the unwanted cache from the customer location/edge 106 and region(a1) data center 104 and optimizes the cache object at the customer location.

As CDML matures, when new customers are added, the system itself automatically prefetches the cache object. This process comprises continuous learning based on the data usage, customer edge prediction results, regional prediction results, and core prediction results.

CDML is performed in core data center 102 and region (a1) data center 104 to distribute the ML computation load. Also, such distribution helps to prevent security issues by not requiring sensitive data to be transferred from the customer location/edge 106.

Figure 2:
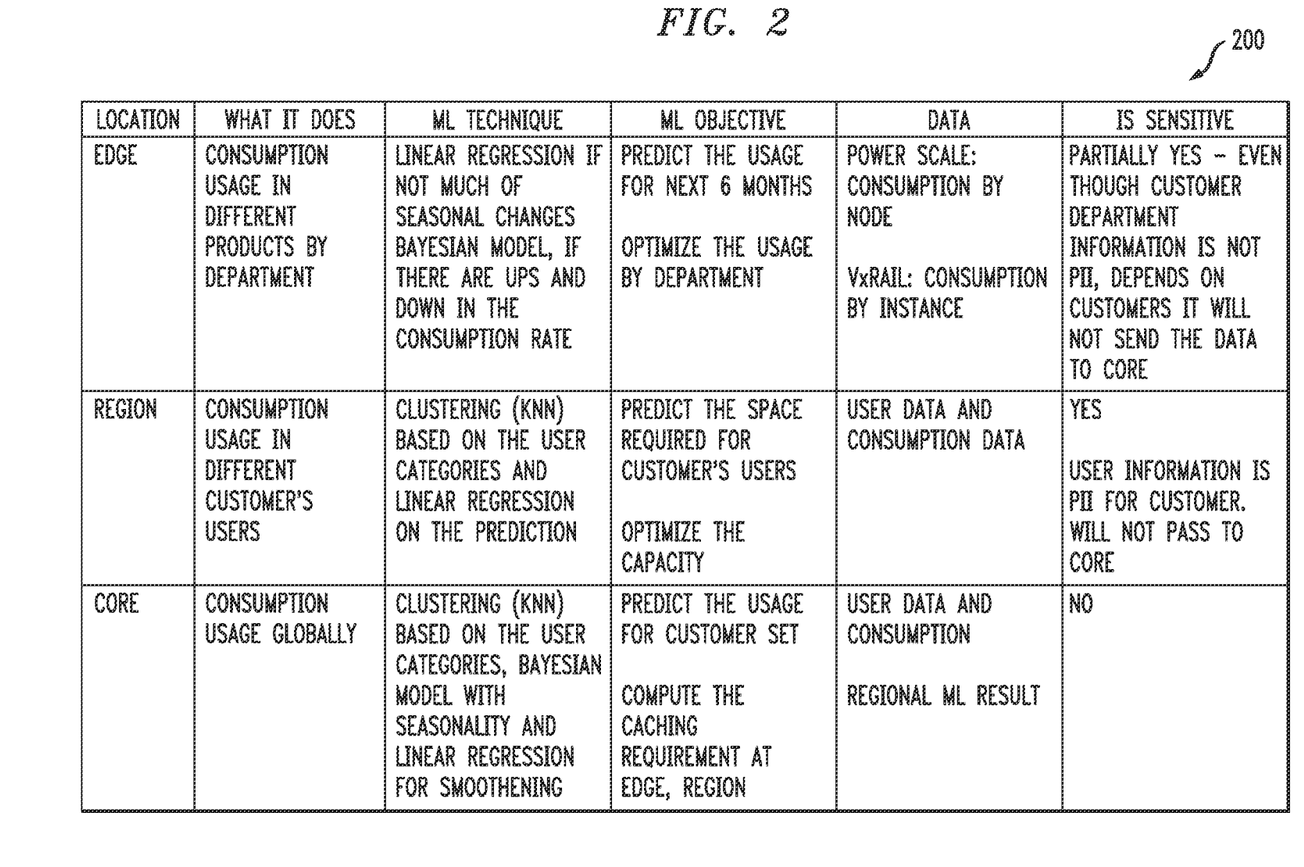
FIG. 2 illustrates aspects of machine learning for artificial intelligence-based cache distribution according to an illustrative embodiment.

The first level of ML computation for customer consumption usage occurs at customer location/edge 106. The ML model is transferred to the customer location, and sensitive data can be used for machine learning to generate prediction, optimization or classification results (rather than be transferred to the core data center 102 or region(a1) data center 104). The ML model is thereby trained at customer location/edge 106. Initial stages of ML computation are outlined in table 200 of FIG. 2. Advantageously, since the customer location/edge 106 can now generate real time analytics, the need of passing data to the core data center 102 or region(a1) data center 104 is considerably reduced.

Figure 3:
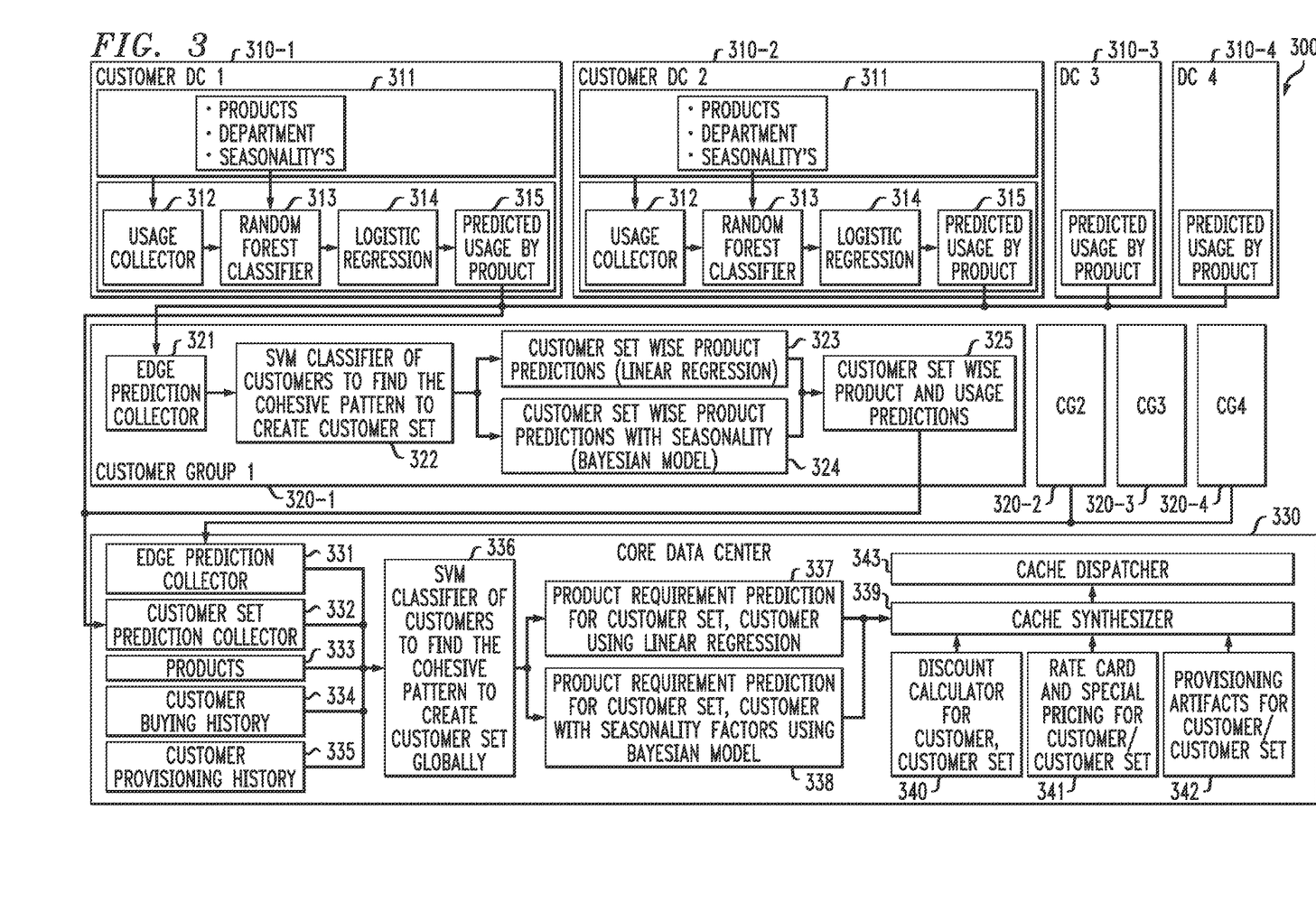
FIG. 3 illustrates a data management architecture using artificial intelligence-based cache distribution according to an illustrative embodiment.

FIG. 3 illustrates a data management architecture 300 according to an illustrative embodiment. It is to be understood that data management architecture 300 is more generally considered an information processing system.

As shown, FIG. 3 depicts a plurality of customer data centers 310-1 (Customer DC1), 310-2 (Customer DC2), 310-3 (Customer DC3) and 310-4 (Customer DC4) (individually referred to herein as customer data center 310 and collectively as customer data centers 310). Each customer data center 310 is considered an edge computing network comprising of one or more processing devices. Customer data centers 310 are collectively considered a customer level of the data management architecture 300.

Each customer data center 310 is operatively coupled to a customer group. As shown, data management architecture 300 comprises a plurality of customer groups 320-1 (CG1), 320-2 (CG2), 320-3 (CG3) and 320-4 (CG4) (individually referred to herein as customer group 320 and collectively as customer groups 320). Each customer group 320 is considered a regional data center comprising of one or more processing devices, and the plurality of regional data centers are collectively considered a customer group (or fog) level of the caching strategies 100. Note that while customer data centers 310-1, 310-2, 310-3 and 310-4 are shown operatively coupled to and part of customer group 320-1, additional sets of customer data centers (not expressly shown) are respectively operatively coupled to and considered part of customer groups 320-2, 320-3 and 320-4.

Further shown in FIG. 3, each customer group 320 is operatively coupled to a core data center 330. Core data center 330 is considered a cloud computing network comprising of one or more processing devices, and considered a core level of the data management architecture 300.

As will be further explained, data management architecture 300 implements ML computing functionality whereby each customer data center 310 is configured to provide edge ML functionality, each regional data center/customer group 320 is configured to provide fog ML functionality and core data center 330 is configured to provide core ML functionality.

Referring back to the customer level, each customer data center 310 comprises customer data 311, a usage collector 312, a random forest classifier 313, a logistic (linear) regression module 314, and customer prediction data 315 representing predicted usage by product. Further, at the customer group level, each customer group 320 comprises an edge prediction collector 321, a support vector machine (SVM) classifier 322, a linear regression module 323, a Bayesian model predictor 324, and customer group/set prediction data 325. Still further, at the core level, core data center 330 comprises an edge prediction collector 331, a customer set prediction collector 332, products data 333, customer buying history data 334, customer provisioning history data 335, an SVM classifier 336, a linear regression module 337, a Bayesian model predictor 338, a cache synthesizer 339, a discount calculator 340, a rate card and pricing data 341, a provisioning artifacts 342, and a cache dispatcher 343. An exemplary process flow will now be described in the context of FIG. 3.

(1) Within each customer data center 310 (each edge computing network), usage collector 312 collects usage data from customer data 311 to perform a local prediction of usage at the customer level for different products (e.g., private cloud/storage/object storage, etc.).

(2) The local prediction at the customer level is performed by random forest classifier 313 (for products, department and seasonality data) and logistic regression module 314. Conventional random forest and regression algorithms, as well as other ML-based prediction algorithms, can be employed. The result is customer prediction data 315 which is sent by each customer data center 310 to its corresponding customer group 320 (fog computing network).

(3) Within each regional data center/customer group 320 is an edge prediction collector 321 that receives the customer prediction data 315 from each customer data center 310 associated therewith.

(4) SVM classifier 322 first classifies similar customers and products and creates a customer Group (CG)/customer set for the particular customer group. Conventional SVM classification, as well as other ML-based classification algorithms, can be employed.

(5) Linear regression module 323 predicts the usage and requirements for the customer group/customer set, while seasonality/holiday variations are provided to Bayesian model predictor 324 for predicting usage and requirements for the customer group/customer set. Conventional Bayesian network model and regression algorithms, as well as other ML-based prediction algorithms, can be employed. The resulting customer group/set prediction data 325 from linear regression module 323 and Bayesian model predictor 324 is provided to core data center 330 (core level) from each customer group 320.

(6) Within core data center 330, customer set prediction collector 332 receives the customer group/set prediction data 325 from each customer group 320 associated therewith. Note also that, as shown, core data center 330 also comprises an edge prediction collector 331 that receives customer prediction data 315 from some or all of customer data centers 310 and utilizes it in the core level prediction operations as further explained below.

(7) SVM classifier 336 receives data from edge prediction collector 331, customer set prediction collector 332, product data 333, customer buying history data 334 and customer provisioning history data 335 to find a cohesive pattern between the customer/customer group and product. Conventional SVM classification, as well as other ML-based classification algorithms, can be employed.

(8) Linear regression module 337 and Bayesian model predictor 338 (similar to the linear regression module 323 and Bayesian model predictor 324) predicts customer requirements from the customer group level prediction results. Conventional Bayesian network model and regression algorithms, as well as other ML-based prediction algorithms, can be employed.

(9) Core level prediction results are then provided to cache synthesizer 339 which also inputs data from discount calculator 340, rate card and pricing data 341 and provisioning artifacts 342 as further explained below. Cache synthesizer 339 generates (syncs/federates) the content (data) that is to be distributed (delivered/dispatched) to customer group 320 and/or customer data centers 310. Cache dispatcher 343 receives the output of cache synthesizer 339. Cache dispatcher 343 implements intelligent cache (data) delivery as will be further explained below in the context of FIGS. 4 and 5.

By way of one exemplary customer level use case, assume cloud resource usage for customer data center 310-1 is constantly on the high side for a Dell Technologies Inc. hardware implementation comprising a Vx Rail™ with VCF™ configuration. Cache synthesizer 339, using data from discount calculator 340, pricing data 341 and/or provisioning artifacts 342, can determine to allocate additional discounted memory to customer data center 310-1. Thus, cache dispatcher 343 updates customer data center 310-1 regarding this allocation.

In a customer group level use case, assume that PowerStore™ storage (Dell Technologies Inc.) for customer group 320-3 and 320-4 will reach to 80% of consumption in two months. Cache synthesizer 339, using data 340, data 341 and/or 342, can determine to ship additional storage. Product catalog cache is updated by cache dispatcher 343 for customer group 320-3 and 320-4.

In a core level use case, assume that the PowerStore™ license is being upgraded in core data center 330. Cache synthesizer 339, using data from discount calculator 340, pricing data 341 and/or provisioning artifacts 342, can determine to publish this upgrade via cache dispatcher 343 to all customer data center cache using PowerStore™.

In accordance with one or more illustrative embodiments, cache dispatch/delivery is configured as follows:

(i) MultiCast Delivery (e.g., license cache update for all PowerStore™) from core to customer location.

(ii) Coordinated MultiPoint (CoMP) Delivery (e.g., PowerStore™ catalog cache update for CG3 and CG4) from core to fog/region/customer group to customer location.

(iii) Point-to-Point Delivery (e.g., special discount on VRail™ for customer DC1) from core to customer location.

Figure 4:
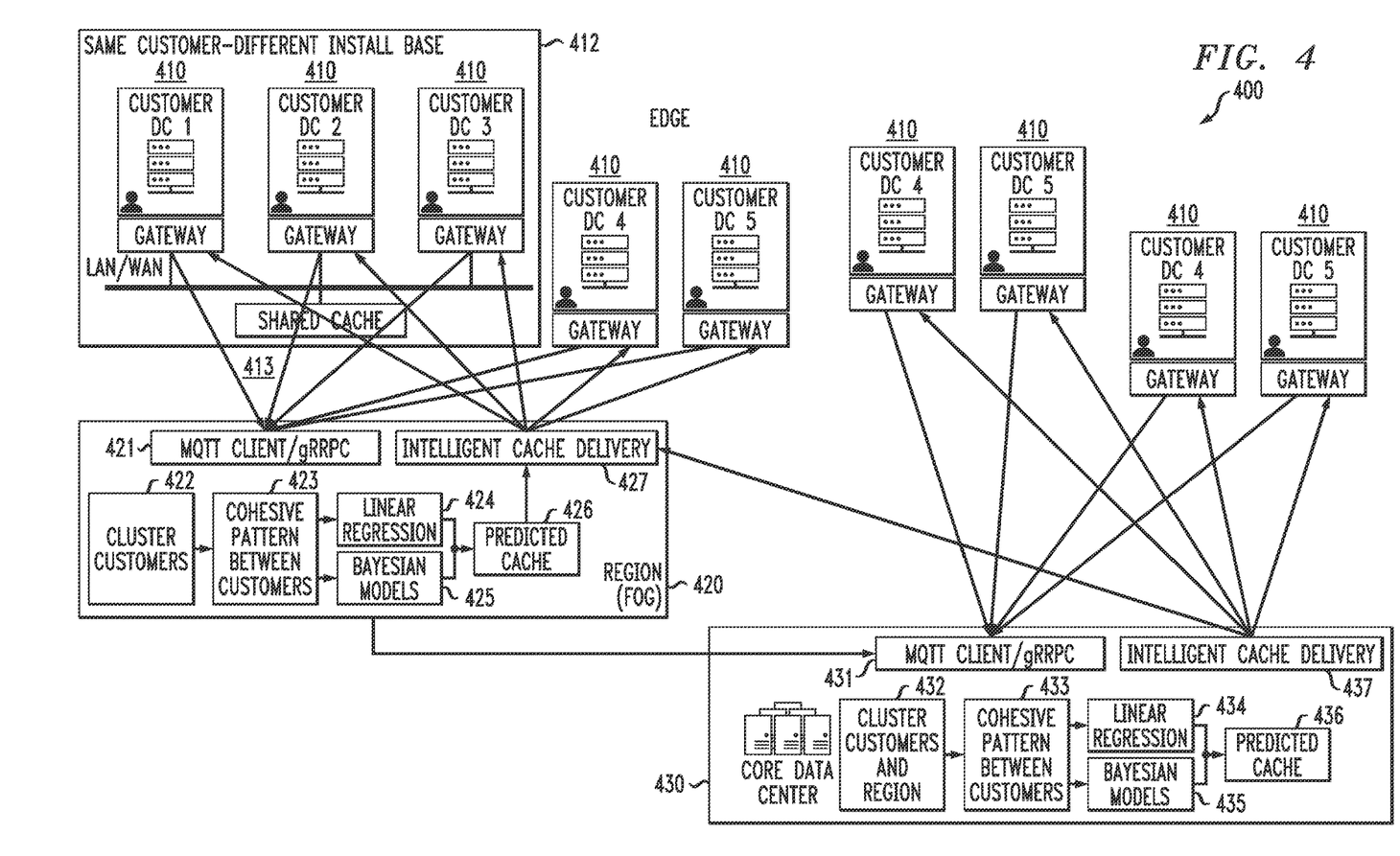
FIG. 4 illustrates intelligent data delivery in a data management architecture using artificial intelligence-based cache distribution according to an illustrative embodiment.

FIG. 4 illustrates intelligent data delivery in a data management architecture 400 using artificial intelligence-based cache distribution according to an illustrative embodiment. As shown, corresponding to customer data center, customer group and core data center (310, 320 and 330) depicted in FIG. 3, FIG. 4 shows an edge level with a plurality of customer data centers 410, a fog level with a regional data center 420 and a core level with a core data center 430. Note that the three leftmost customer data centers highlighted in the box are located at the same customer location but have different install bases, and are considered a cluster 412. As shown, the customer data centers 410 in cluster 412 can share a cache, e.g., shared cache 413. Note also that each customer data center 410 has a gateway device through which it operatively couples with regional data center 420 and/or core data center 430.

Further, as shown in FIG. 4, regional data center 420 includes a Message Queuing Telemetry Transport (MQTT) client/gRRPC (Remote Procedure Call) 421 with which it communicates with the gateways of customer data centers 410. Regional data center 420 clusters customers (422) and determines one or more cohesive patterns between customers (423). The patterns are then input to a linear regression algorithm 424 and a Bayesian model algorithm 425 to determine the predicted cache 426. Intelligent cache delivery (427) then occurs based on the predicted cache 426. These operations are similar to what is depicted in FIG. 3 for customer group 320.

Still further, as shown in FIG. 4, core data center 430 includes a MQTT client/gRRPC 431 with which it communicates with the gateway of one or more customer data centers 410 and regional data center 420. Core data center 430 clusters customers and regions (432) and determines one or more cohesive patterns between customers/regions (433). The patterns are then input to a linear regression algorithm 434 and a Bayesian model algorithm 435 to determine the predicted cache 436. Intelligent cache delivery (437) then occurs based on the predicted cache 436. These operations are similar to what is depicted in FIG. 3 for customer group 320.

Figure 5:
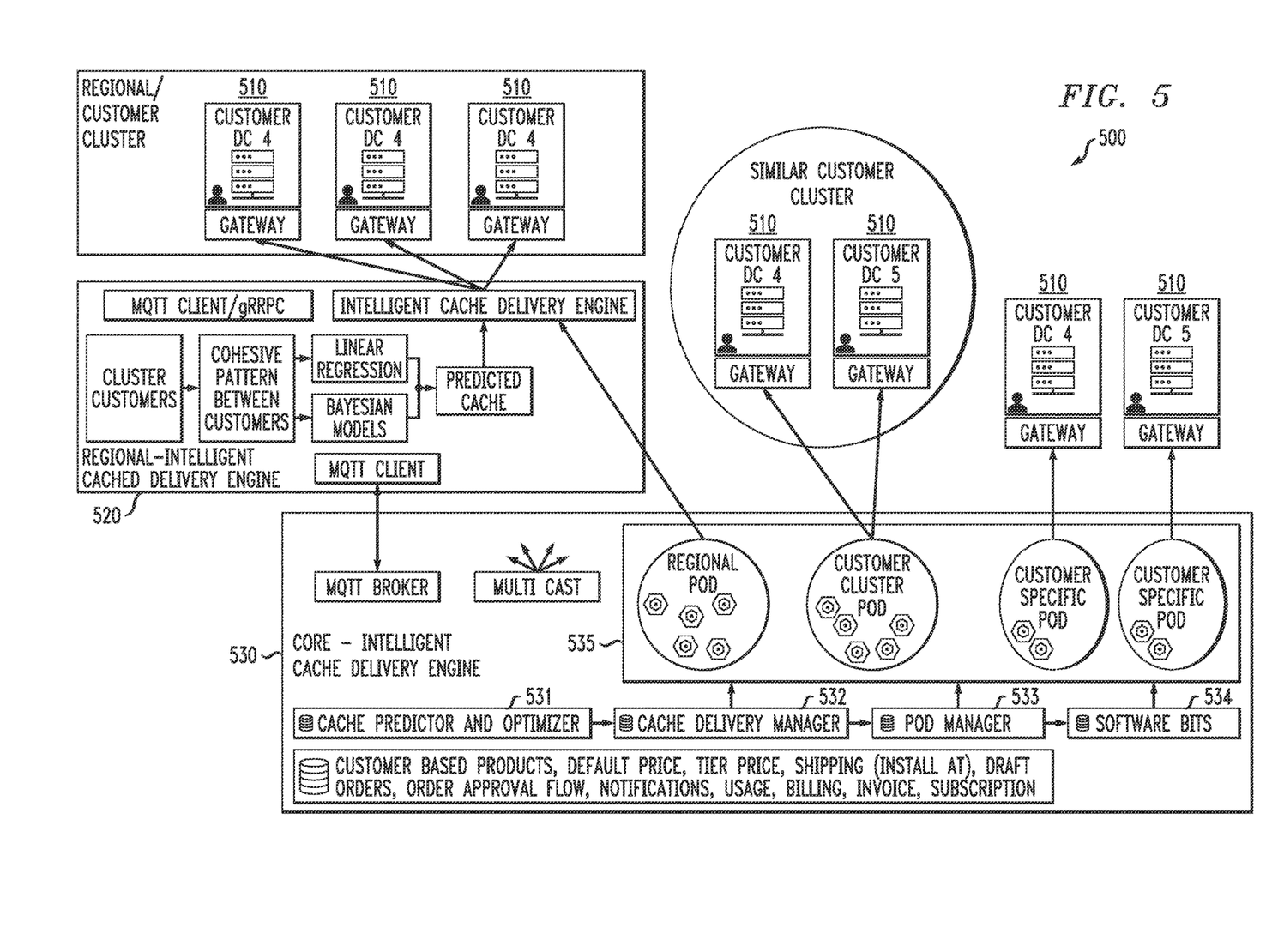
FIG. 5 illustrates details of intelligent data delivery in a data management architecture using artificial intelligence-based cache distribution according to an illustrative embodiment.

FIG. 5 illustrates further details of intelligent cache delivery shown in FIG. 4, according to an illustrative embodiment. More particularly, data management architecture 500 comprises customer data centers 510, a regional data center 520, and a core data center 530. Customer data centers 510, regional data center 520, and core data center 530 are assumed to have similar components as those described above in the context of FIG. 4 for customer data centers 410, a regional data center 420, and a core data center 430. However, FIG. 5 depicts components of intelligent cache delivery in core data center 530. As shown, intelligent cache delivery in core data center 530 comprises a cache predictor and optimizer 531, a cache delivery manager 532, a pod manger 533, software bits 534 and pods 535. Pods refer to the smallest execution units in a Kubernetes container orchestration environment. A pod encapsulates one or more containers. As shown in FIG. 5, pods 535 comprise regional pods, customer cluster pods, and customer specific pods. Cache delivery involves placing/replacing cache (content) to and from customer data centers. Caching recommendations can be for all customers, a cluster of customers, or individual customers.

More particularly, cache predictor and optimizer 531 performs the CDML techniques as described herein. Cache delivery manager 532 manages cache deliver, while pod manager 533 manages the various pods 535. Software bits 534 are used for cache provisioning. For each type of delivery, a dedicated pod is assigned. A multicast is a communication blast to all customer data centers 510. A given customer data centers 510 listens to the pod and places/replaces the cache (e.g., cloud policy). A regional pod is dedicated to place and replace the cache in the regional data center 520, which is accessible to all customer data centers 510 in that region (e.g., regional compliance data). A customer cluster pods is dedicated to a customer set, i.e., similar customer derived based on core clustering which is based on usage data and products (e.g., software binary for the pool of customers (customer set). A customer pod is dedicated to the specific customer, e.g., price for a specific product to the customer.

Figure 6:
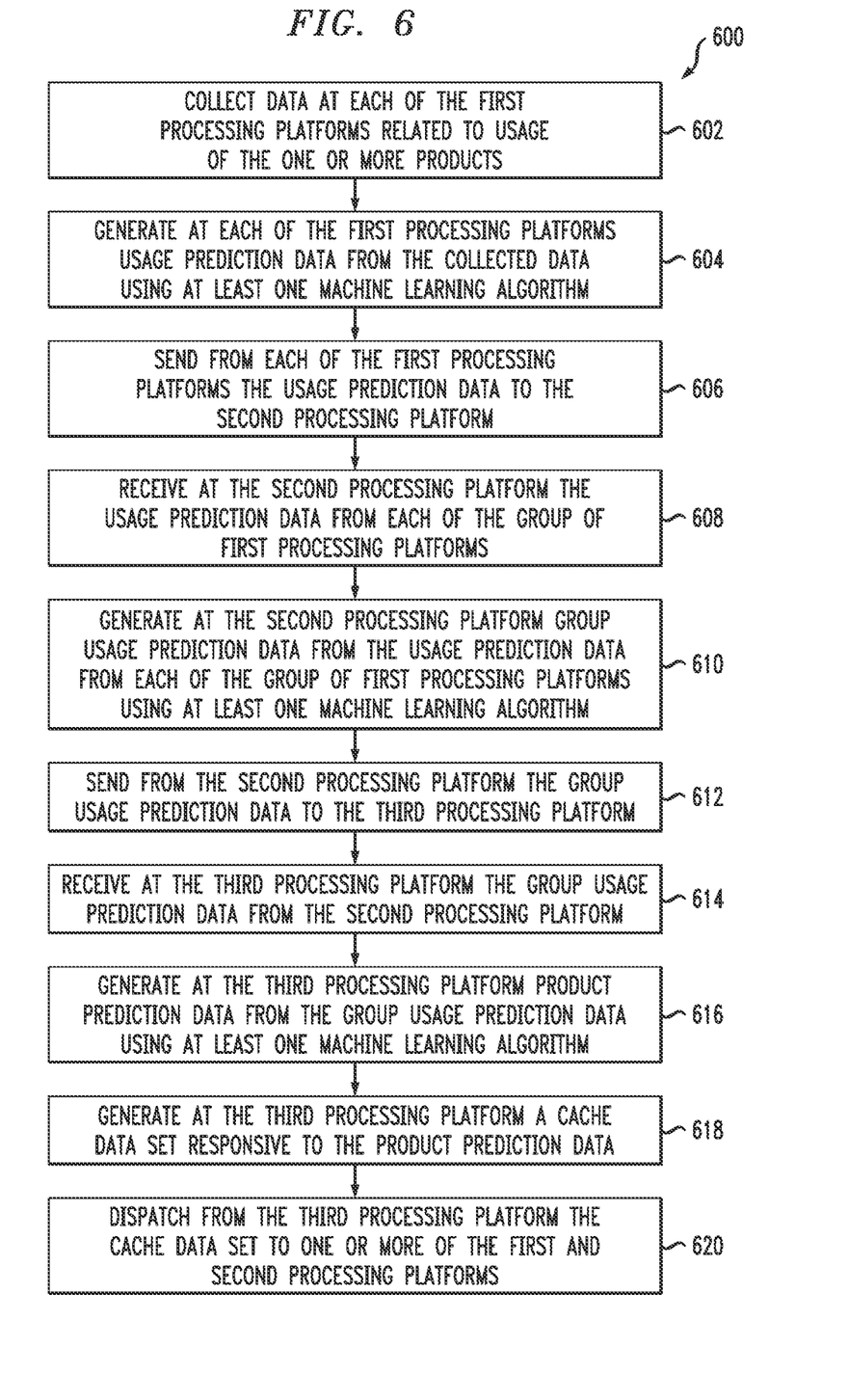
FIG. 6 illustrates a methodology for data management using artificial intelligence-based cache distribution according to an illustrative embodiment.

FIG. 6 illustrates a data management methodology 600, according to an illustrative embodiment, in a system comprising first processing platforms (e.g., customer data centers) located at one or more sites at which one or more products are used, at least a second processing platform (e.g., a regional data center) operatively coupled to a group of the first processing platforms, and at least a third processing platform (e.g., a core data center) operatively coupled to the second processing platform.

Step 602 collects data at each of the first processing platforms related to usage of the one or more products. Step 604 generates at each of the first processing platforms usage prediction data from the collected data using at least one machine learning algorithm. Step 606 sends from each of the first processing platforms the usage prediction data to the second processing platform.

Step 608 receives at the second processing platform the usage prediction data from each of the group of first processing platforms. Step 610 generates at the second processing platform group usage prediction data from the usage prediction data from each of the group of first processing platforms using at least one machine learning algorithm. Step 612 sends from the second processing platform the group usage prediction data to the third processing platform.

Step 614 receives at the third processing platform the group usage prediction data from the second processing platform. Step 616 generates at the third processing platform product prediction data from the group usage prediction data using at least one machine learning algorithm. Step 618 generates at the third processing platform a cache data set responsive to the product prediction data. Step 620 dispatches from the third processing platform the cache data set to one or more of the first and second processing platforms.

Figure 7:
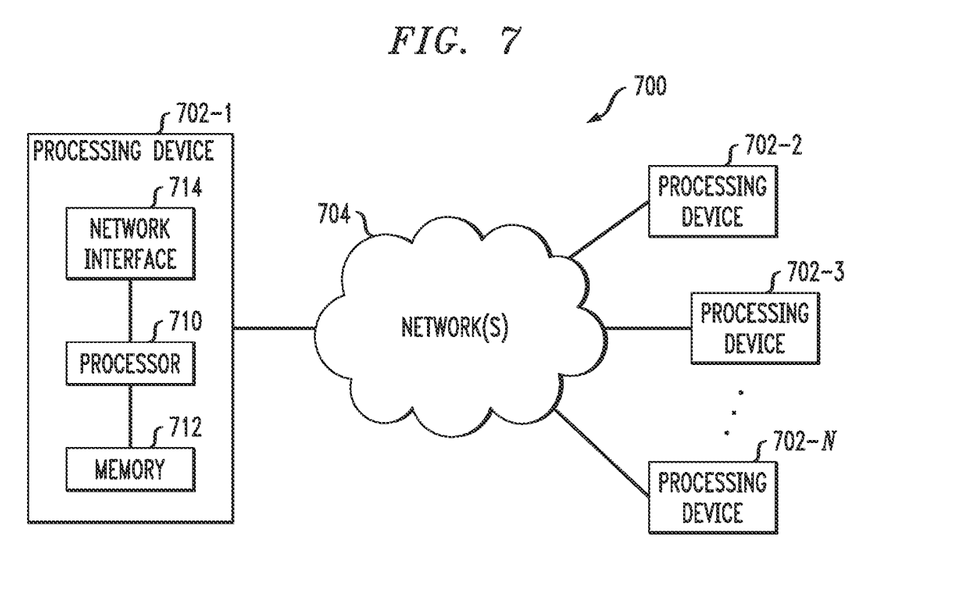
FIG. 7 shows an example of a processing platform that may be utilized to implement at least a portion of an information processing system for data management using artificial intelligence-based cache distribution functionalities according to an illustrative embodiment.

FIG. 7 depicts a processing platform 700 on which a computing environment with functionalities described herein can be implemented. More particularly, processing platform can be used to implement information processing system architectures as shown in FIGS. 3, 4 and 5. Processing platform 700 comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture or computer program products comprising such computer-readable or processor-readable storage media are considered embodiments of the invention. A given such article of manufacture may comprise, for example, a storage device such as a storage disk, a storage array or an integrated circuit containing memory. The terms "article of manufacture" and "computer program product" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
a first processing platform comprising at least one processor coupled to at least one memory configured to execute program code, wherein the first processing platform is operatively coupled to at least a second processing platform which is operatively coupled to at least a group of third processing platforms and each of the third processing platforms are located at one or more sites at which one or more products are used, and wherein the first processing platform is configured to:
receive group usage prediction data generated using at least one machine learning algorithm by the second processing platform based on usage prediction data generated using at least one machine learning algorithm by each of the group of third processing platforms based on data related to the usage of the one or more products;
generate product prediction data from the group usage prediction data using at least one machine learning algorithm;
generate a cache data set responsive to the product prediction data; and
dispatch the cache data set to one or more of the second processing platform and ones of the third processing platforms;
wherein the first processing platform is further configured to classify the group of third processing platforms using at least one machine learning algorithm and based on the group prediction data and historical procurement and provisioning data related to the one or more products to identify one or more behavior patterns.

2. The apparatus of claim 1, wherein the at least one machine learning algorithm used at each of the third processing platforms comprises at least one of a linear regression algorithm and a random forest classification algorithm.

3. The apparatus of claim 1, wherein the at least one machine learning algorithm used at each of the first processing platform and the second processing platform comprises at least one of a linear regression algorithm and a Bayesian model algorithm.

4. The apparatus of claim 1, wherein the at least one machine learning algorithm at the second processing platform comprises a support vector machine classification algorithm.

5. The apparatus of claim 1, wherein the first processing platform dispatches the cache data set to one or more of the second and ones of the third processing platforms using one or more of a point-to-point delivery protocol, a multicast delivery protocol, and a coordinated multipoint delivery protocol.

6. The apparatus of claim 1, wherein the dispatched cache data set relates to one or more of procurement, provisioning and support related to the one or more products.

7. The apparatus of claim 1, wherein the first processing platform comprises a cloud-based computing network.

8. The apparatus of claim 1, wherein the second processing platform comprises a fog-based computing network.

9. The apparatus of claim 1, wherein each of the third processing platforms comprises an edge-based computing network.

10. A method comprising:
in a system comprising a first processing platform operatively coupled to at least a second processing platform, the second processing platform operatively coupled to at least a group of a third processing platforms, and the third processing platform located at one or more sites at which one or more products are used;
receiving at the first processing platform group usage prediction data from the second processing platform;
generating at the first processing platform product prediction data from the group usage prediction data using at least one machine learning algorithm;
generating at the first processing platform a cache data set responsive to the product prediction data;
dispatching from the first processing platform the cache data set to one or more of the second and ones of the third processing platforms; and
classifying at the first processing platform the group of third processing platforms using at least one machine learning algorithm and based on the group prediction data and historical procurement and provisioning data related to the one or more products to identify one or more behavior patterns.

11. The method of claim 10, further comprising:
receiving at the second processing platform usage prediction data from each of the group of third processing platforms;
generating at the second processing platform the group usage prediction data from the usage prediction data from each of the group of third processing platforms using at least one machine learning algorithm; and
sending from the second processing platform the group usage prediction data to the first processing platform.

12. The method of claim 11, further comprising:
collecting data at each of the third processing platforms related to usage of the one or more products;
generating at each of the third processing platforms the usage prediction data from the collected data using at least one machine learning algorithm; and
sending from each of the third processing platforms the usage prediction data to the second processing platform.

13. The method of claim 10, wherein the first processing platform dispatches the cache data set to one or more of the second and ones of the third processing platforms using one or more of a point-to-point delivery protocol, a multicast delivery protocol, and a coordinated multipoint delivery protocol.

14. The method of claim 10, wherein the dispatched cache data set relates to one or more of procurement, provisioning and support related to the one or more products.

15. The method of claim 10, wherein the first processing platform comprises a cloud-based computing network, the second processing platform comprises a fog-based computing network, and each of the third processing platforms comprises an edge-based computing network.

16. A computer program product comprising a non-transitory processor-readable storage medium having stored therein program code of one or more software programs in a system comprising a first processing platform operatively coupled to at least a second processing platform, the second processing platform operatively coupled to at least a group of a third processing platforms, and the third processing platform located at one or more sites at which one or more products are used, wherein the program code when executed causes the system to:
receive at the first processing platform group usage prediction data from the second processing platform;

generate at the first processing platform product prediction data from the group usage prediction data using at least one machine learning algorithm;

generate at the first processing platform a cache data set responsive to the product prediction data;

dispatch from the first processing platform the cache data set to one or more of the second and ones of the third processing platforms; and classify at the first processing platform the group of third processing platforms using at least one machine learning algorithm and based on the group prediction data and historical procurement and provisioning data related to the one or more products to identify one or more behavior patterns.

17. The computer program product of claim 16, wherein the program code when executed further causes the system to:

receive at the second processing platform usage prediction data from each of the group of third processing platforms;

generate at the second processing platform group usage prediction data from the usage prediction data from each of the group of third processing platforms using at least one machine learning algorithm; and send from the second processing platform the group usage prediction data to the first processing platform.

18. The computer program product of claim 17, wherein the program code when executed further causes the system to:

collect data at each of the third processing platforms related to usage of the one or more products;

generate at each of the third processing platforms the usage prediction data from the collected data using at least one machine learning algorithm; and send from each of the third processing platforms the usage prediction data to the second processing platform.

19. The computer program product of claim 16, wherein the first processing platform dispatches the cache data set to one or more of the second and third processing platforms using one or more of a point-to-point delivery protocol, a multicast delivery protocol, and a coordinated multipoint delivery protocol.

20. The computer program product of claim 16, wherein the first processing platform comprises a cloud-based computing network, the second processing platform comprises a fog-based computing network, and each of the third processing platforms comprises an edge-based computing network.

* * * * *

UNITED STATES PATENT AND TRADEMARK OFFICE
CERTIFICATE OF CORRECTION

PATENT NO. : 11,657,112 B2
APPLICATION NO. : 17/236287
DATED : May 23, 2023
INVENTOR(S) : Panikkar et al.

It is certified that error appears in the above-identified patent and that said Letters Patent is hereby corrected as shown below:

On the Title Page

Item (57), please delete:
"Techniques are disclosed for data management techniques using artificial intelligence-based cache distribution within a distributed information processing system. For example, a cohesive and distributed machine learning approach between the same or similar customer data centers and products predict optimal data needed at each customer data center, and intelligently synchronize or federate the data between customer data centers and a core data center using a combination of customized caching and push techniques according to one or more customer behavior patterns."

And insert:
--Data management techniques using artificial intelligence-based cache distribution within a distributed information processing system are disclosed. For example, a cohesive and distributed machine learning approach between the same or similar customer data centers and products predicts optimal data needed at each customer data center, and intelligently synchronizes or federates the data between customer data centers and a core data center using a combination of customized caching and push techniques according to one or more customer behavior patterns.--

Signed and Sealed this
Eighteenth Day of July, 2023

Katherine Kelly Vidal
*Director of the United States Patent and Trademark Office*